United States Patent [19]
Buckingham

[11] Patent Number: 5,333,129
[45] Date of Patent: Jul. 26, 1994

[54] ACOUSTIC IMAGING IN THE OCEAN USING AMBINET NOISE

[75] Inventor: Michael J. Buckingham, La Jolla, Calif.

[73] Assignee: The Regents of the University of California, Oakland, Calif.

[21] Appl. No.: 12,894

[22] Filed: Feb. 3, 1993

[51] Int. Cl.[5] ............................................. G01S 15/00
[52] U.S. Cl. ......................................... 367/7; 367/11; 367/124; 367/126
[58] Field of Search ...................... 367/7, 11, 124, 126, 367/129-135

[56] References Cited

U.S. PATENT DOCUMENTS

| | | | |
|---|---|---|---|
| 4,086,560 | 4/1978 | Johnston et al. | 367/1 |
| 5,175,710 | 12/1992 | Hutson | 367/135 |
| 5,216,640 | 6/1993 | Donald et al. | 367/124 |

OTHER PUBLICATIONS

"Theory of Acoustic Imaging in the Ocean with Ambinet Noise", Michael J. Buckingham, Journal of Computational Acoustics, vol. 1, No. 1, (May 1993), 117-140.

"Acoustic Daylight: Imaging the Ocean with Ambient Noise", Michael J. Buckingham, Scripps Institute of Oceanography 1992 Annual Report, Jul. 1993, 9-12.

"Using Natural Sounds, System Tries to 'See' Objects Deep in Ocean", Malcolm W. Browne, The New York Times, Apr. 21, 1992, p. B7.

"Sound System", Philip Yam, Scientific American, Jul. 1992, p. 30.

"Looking Ahead, Sonar Could Help Ships Steer Clear", David L. Chandler, The Boston Globe, Aug. 24, 1992, pp. 29-30.

"Underwater TV Shows as Sonar Loses that 'Ping'", Howard Smith, The Mail on Sunday (U.K.), Apr. 5, 1992.

"Taking a Peek in the Deep by Using Your Ears", John H. Lee, Los Angeles Times, Mar. 28, 1992.

"Bubbles May Help Us 'See' Under Water", Roger Highfield, Daily Telegraph, (London, G.B.) Mar. 30, 1992.

"Method Found to See by Sound in Ocean", Scott LaFee, San Diego Union-Tribune, Mar. 26, 1992 p. B1, B4.

"Incoherent Imaging with Ambient Noise", Michael J. Buckingham, Oceans 92: Mastering the Oceans Through Technology Proceedings; vol. 1, Oct. 26-29, 1992.

"Imaging the Ocean with Ambient Noise", Michael J. Buckingham, et al., Nature, vol. 356, Mar. 26, 1992, pp. 327-329.

Primary Examiner—Daniel T. Pihulic
Attorney, Agent, or Firm—Brown, Martin, Haller & McClain

[57] ABSTRACT

An array of acoustic sensors is positioned near the object to be imaged so that an array of detection beams impinge upon the surface of the object. The ambient noise in the ocean which is generated by both natural and manmade phenomena is reflected off of the target object and collected by the acoustic sensors. Each beam corresponds to a single pixel of an image of the object. The amplitude and frequency differences between the signals derived from each beam permit contrast to be developed between the pixels so that an image is formed. A first embodiment utilizes a parabolic or spherical reflector to focus the noise reflected from the object onto one or more sensors. A two dimensional array of sensors is required to produce an image. A second embodiment uses a phased array of acoustic sensors to form an image, with the phased array of sensors being used to generate a large number of scanned beams, each beam corresponding to one pixel of the image. Motion pictures can be generated by updating the image formed by the a multi-sensor array at a pre-determined frequency. "Acoustic color" can be identified by frequency information contained in the noise spectrum.

24 Claims, 3 Drawing Sheets

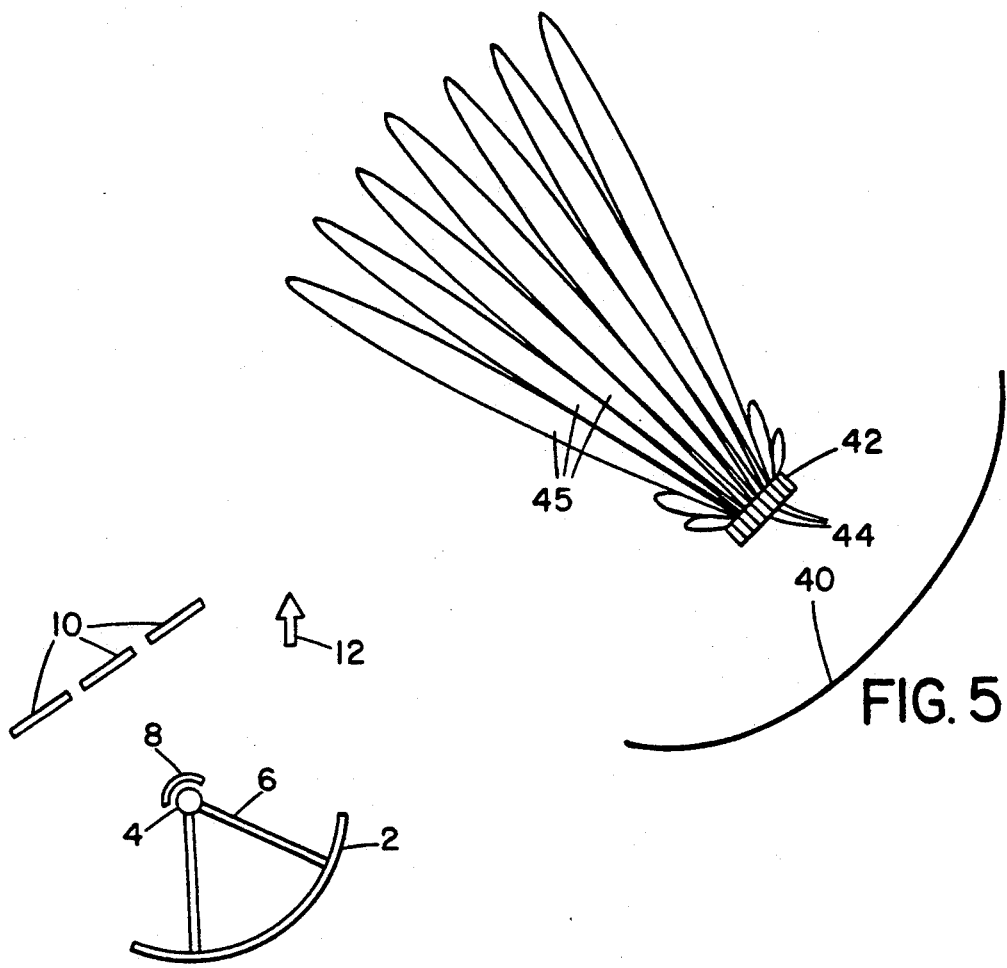
FIG. 2
FIG. 5
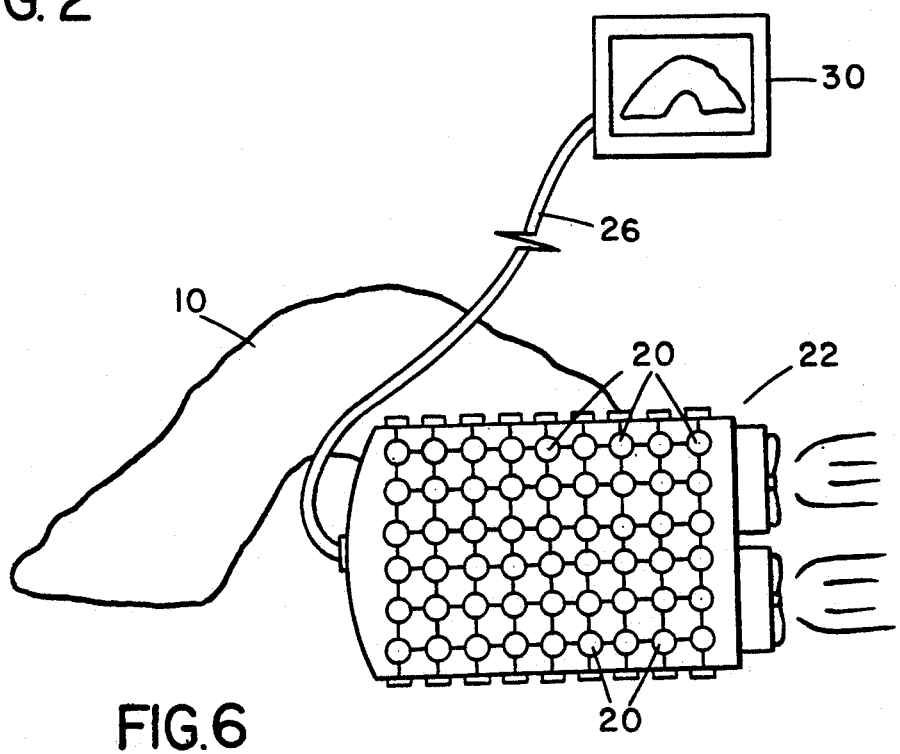
FIG. 6

ACOUSTIC IMAGING IN THE OCEAN USING AMBINET NOISE

This invention was made with Government support under Contract No. N00014-90-J-1275 awarded by the Office of Naval Research. The Government has certain rights in this invention.

BACKGROUND OF THE INVENTION

The transmission of optical energy through ocean water is subject to a number of limitations due to absorption and other loss mechanisms. Although a few applications exist for use of optical imaging systems, the primary means for probing the ocean is by acoustics, since the water is essentially transparent to sound. While light can travel on the order of tens of meters in the ocean, sound can travel thousands of kilometers.

The two most widely used acoustic techniques for probing the ocean are "active", or "echo-ranging", where an energetic acoustic signal is transmitted into the ocean, with the presence of the objects being inferred from the echoes they produce, and "passive", or "direct", in which the receiver detects sounds produced by the object to be imaged. While both of these techniques are effective, they are limited by, among other things, background noise. Also, the signal produced, which is usually a "blip" on a screen requires interpretation by skilled personnel. Detailed images are not available.

The ocean below the surface is a noisy environment. This ambient noise is generated by a number of sources including breaking waves, wind, spray, rain, man-made sources such as ships, underwater drilling and exploration, and marine mammals. This ambient noise is incoherent, radiating randomly in all directions from the source.

The ambient noise within the ocean is analogous to daylight in the atmosphere. The incoherent light which comprises daylight allows objects to be seen without relying on active or passive methods of detection. The ability to see an object in daylight may be enhanced by using lenses, e.g., cameras, microscopes and binoculars, to focus the light at the viewer's eye or on film or an image detector. Following the analogy, it should be possible to use ambient noise in the ocean as "acoustic daylight" for seeing in the ocean.

SUMMARY OF THE INVENTION

It is an advantage of the present invention to utilize the ambient noise in the ocean to create an acoustic image of an object in the ocean environment, much as daylight does for visual imaging.

It is another advantage of the present invention to provide a method for imaging objects in the ocean which is enhanced rather than limited by acoustic interference from various sources.

It is a further advantage of the present invention to provide a method for generating stereoscopic acoustic images of an underwater object.

Another advantage of the invention is to provide a method for generating moving images of objects in the ocean.

Still another advantage of the invention is to provide a method for distinguishing "acoustic color" of underwater objects.

In the first exemplary embodiment, a parabolic reflector with a hydrophone (acoustic transducer) at its focal point is placed in the ocean facing toward the object to be imaged. The hydrophone is shielded so that it receives only the reflected noise from the reflector, and not any direct noise. The parabolic reflector's main lobe is approximately equal in size to, if not larger than, the entire object. The main lobe is directed so that it hits the target broadside. The hydrophone converts the reflected noise into an electronic signal representative of a noise spectrum across a frequency band of 5 to 50 kHz. For improved resolution, several noise spectra are generated and an average is determined. This average spectrum is representative of the "on target" reading. The parabolic reflector is then directed away from the target and a second group of noise spectra is generated to determine the surrounding or background noise. An average "off target" noise spectrum is generated and a difference spectrum is calculated by comparing the on-target and off-target spectra. The difference spectrum will indicate the presence of the target object by an increased noise level if the object is reflective or a decreased noise level, or "negative signal", if the object is absorptive. The important criterion is that an acoustic contrast between the object and its background be detected.

The first exemplary embodiment generates a single pixel of an image corresponding to the single beam of the parabolic reflector. Multiple reflectors or refractive acoustic lenses with corresponding hydrophones may be incorporated to produce a multi-pixel image.

A second embodiment utilizes a single spherical reflector with a two-dimensional array of acoustic sensors at its focus. Each sensor of the array generates a detection beam, and each beam corresponds to a pixel. An image is formed by exploiting the acoustic contrast, i.e., intensity differences, between the beams, as opposed to producing a difference spectrum for each pixel. The image derived from the sensor array can be used to create a moving picture by updating the image at a predetermined frequency on the order of 10 Hz or more. Stereoscopic images are created by using two arrays of sensors located close to each other within the reflector's focus, so that the image created by each array is slightly offset from the other.

The third exemplary embodiment substitutes a phased array of acoustic sensors for the reflector and hydrophone combination. Each sensor in the array contributes to every detection beam, with the steering of the beams being achieved electronically by phase delay. The use of a phased array allows the formation of a detailed acoustic image, with each beam produced by the array corresponding to one pixel of the image. With the phased array configured to continuously update the image through its detection and signal transfer sequence, motion pictures of the target object can be generated, permitting viewing of moving objects or scanning of large objects by mounting the sensor array on a moving body, such as a remotely operated vehicle (ROV).

By dividing the detected noise spectrum into separate frequency groupings, for example, 5 kHz increments, the "acoustic color" of an object can be determined by comparing the relative amplitudes of the difference signal with frequency with the frequency groupings corresponding to "color". Since some materials absorb certain frequencies and reflect others, just as in daylight, the materials that make up the object can be identified by their acoustic color.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 2 is a diagrammatic view of an embodiment of the inventive system incorporating a parabolic reflector;

FIG. 5 is a diagrammatic view of an embodiment incorporating a spherical reflector and multiple hydrophones;

FIG. 6 is a diagrammatic view of an embodiment incorporating a phased array of sensors mounted on a remotely operated vehicle;

DETAILED DESCRIPTION OF THE PREFERRED EMBODIMENTS

Figure 1:
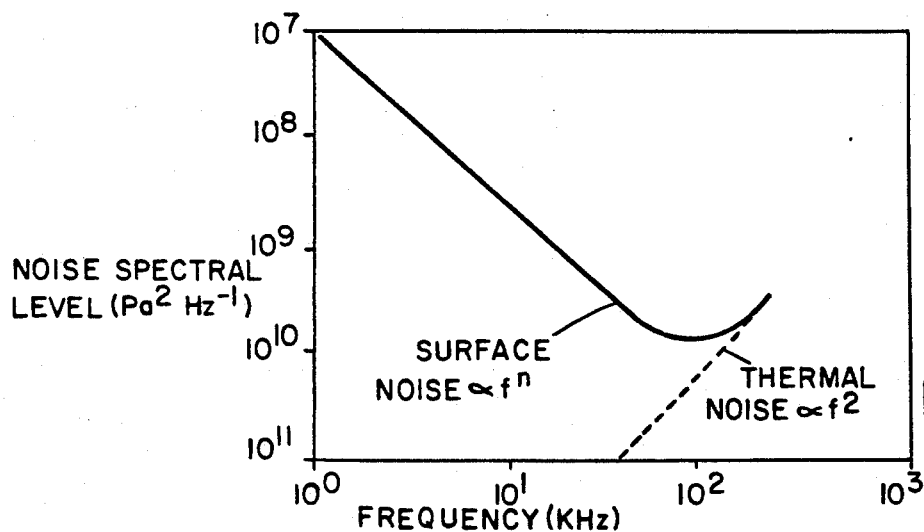
FIG. 1 is a plot of frequency versus noise spectral level for nominal ambient noise in the ocean.

As illustrated in FIG. 2, the system for detecting noise spectra level in the ocean in its most basic configuration comprises a parabolic reflector 2 and hydrophone 4 which may be mounted on a frame 6 to maintain the hydrophone 4 at the focal point of reflector 2. (This distance may be varied remotely to provide passive ranging, as described below.) An acoustic shield 8 is placed around a portion of hydrophone 4 to block direct detection of surrounding noise to avoid interfering with the noise focused on the hydrophone 4 by reflector 2. A signal produced by hydrophone 4 possesses frequency and amplitude information which is used to create a representation of noise spectra such as those illustrated in FIG. 3. To produce the "on-target" noise spectrum, the reflector 2 is directed toward target 10. For the "off-target" spectrum, the parabolic reflector 2 is pointed seaward in the direction indicated by arrow 12.

The ocean is an acoustically noisy environment. Sources of ambient noise including waves, wind, rain, man made structures, ships, marine mammals and other marine life. Over a frequency range between 1 and 50 kHz noise spectral level at the ocean surface shows a negative gradient which varies with frequency f as $f^{-n}$, where $n$ is on the order of 2. Surface-generated noise radiates as an incoherent field, traveling randomly in all directions. Above about 50 kHz, depending on the local condition of the ocean water, thermal noise arising from Brownian motion of the water molecules dominates the ambient noise spectrum. Thermal noise is a localized, non-radiating, microscopic phenomenon which shows a spectrum with a positive gradient, varying with frequency as $f^2$. FIG. 1 illustrates both the radiating surface generated noise and the thermal noise components of the ambient noise spectrum.

The presence of an object in the ambient noise field modifies the field by scattering the acoustic energy impinging upon it. In the first embodiment of the present invention illustrated in FIG. 2, this scattered radiation is collected and focused by an acoustic reflector or acoustic lens onto an image plane in which hydrophone 4 is located. One pixel of an image is provided by each hydrophone, as is done in the second embodiment. After signal processing, a pictorial image made up of the pixels provided by a number of hydrophones is displayed on a television or video monitor. The screen image can be a moving picture, and computer constructed color can be produced, with this "acoustic color" consisting of frequency dependent acoustic albedo.

The embodiment illustrated in FIG. 5 combines a spherical reflector 40 and a two-dimensional array of hydrophones 42. The array is illustrated in a rectangular arrangement, but the actual shape of the array may vary. Each hydrophone 44 has a corresponding beam 45 which provides one pixel of an image of the target object 46. The surface upon which the hydrophone array 42 is located has a slight curvature which positions each hydrophone 44 at the focus of a corresponding segment of the spherical reflector 40. Thus, each hydrophone 44 is uniquely located within the reflector's focus. A spherical reflector is selected to reduce aberrations which might be present in a parabolic reflector. While this embodiment is still limited in its mobility due to the reflector size, such a configuration would be useful in a stationary application, such as monitoring of harbor entrances.

When multiple sensors are used, as in the second and third embodiments, it is not necessary to determine a difference spectrum for each pixel by comparing the background noise with the "on-target" noise. Instead, each pixel is compared against other pixels in the image to establish the contrast.

Figure 7:
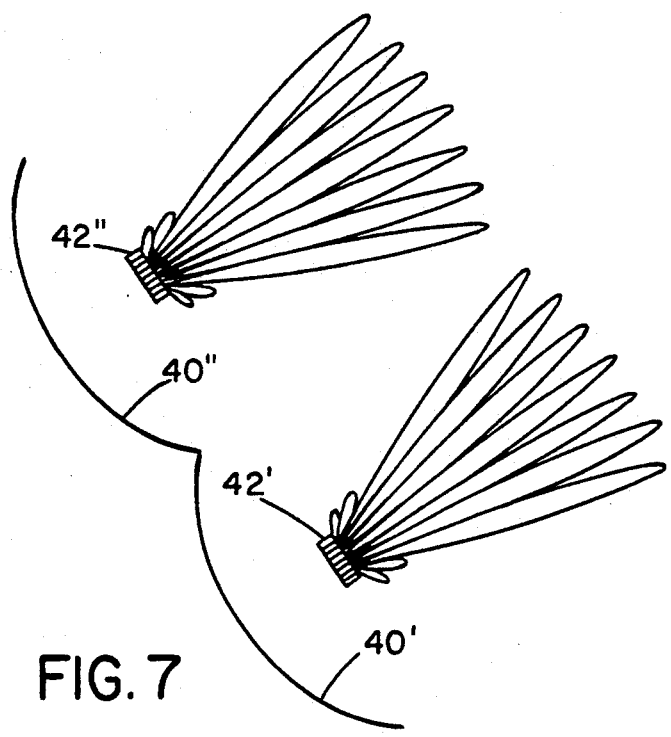
FIG. 7 is a diagrammatic view of the embodiment of FIG. 5 modified to produce stereoscopic images.

If two separate arrays of hydrophones are used, as illustrated in FIG. 7, an acoustic stereoscopic image can be generated in a manner similar to that used for optical stereoscopic imaging. The arrays 42' and 42" can be located within two separate but closely spaced reflectors 40' and 40".

While the ambient noise in the ocean is analogous to daylight, there is a significant distinction in that, due to the shorter wavelength of light, it is possible for much greater detail to be detectable visually than is detectable acoustically in the ocean. To achieve resolution similar to that of the human eye in an acoustic system working at 50 kHz, an aperture of 600 meters would be required. Since practicality demands that a smaller aperture be used, there is a corresponding reduction in angular resolution.

In a third embodiment, a phased array of acoustic sensors and image enhancement techniques, such as those developed in connection with synthetic aperture radar (SAR) and infrared remote sensing imagery is used. As is known, the phased array operates by individually controlling the amplitude and phase activations of each sensor so that the lobe or beam of the sensor array can be scanned.

In FIG. 6, an array of acoustic sensors 20 are placed on a remotely operated vehicle (ROV) 22 which enables the array to be moved around an object 10 and from object to object. In this case, a conformal array is used to allow distribution of the sensors around the hull of the ROV. ROVs are well known in the field of ocean exploration and exploitation. The movement of the ROV 22 may be controlled at the viewing location on a parent vessel through an umbilical cable 26 so that the desired locations of the target object can be observed. Alternatively, the ROV can run independently, controlled by an internal processor, storing the images electronically for transfer at the end of a fixed cycle when it returns to a "home base". Each acoustic sensor 20 of the array contributes to the formation of a number of beams, with the scanning, or "beam steering", being provided electronically by introducing phase delays into the channels within the array. Each beam provides one pixel of an image that will be generated at the image monitor 30. Phased arrays and conformal arrays of detectors are well known in antenna technology. The principles applicable to antennas are equally applicable to the phased arrays and conformal arrays of acoustic sensors of the present invention.

In initial tests of the basic principle of acoustic imaging, a parabolic reflector of diameter 1.22 m with a neoprene rubber pressure release surface was used as an acoustic lens. A low noise hydrophone, shielded at the rear to block direct radiation, was mounted at the focus of the parabolic dish. The arrangement of the components was as illustrated in FIG. 2. The water depth was about 7 meters, and the weather conditions during the experiment, which lasted three days, were calm (sea state 1 or less).

Three rectangular targets consisting of thick plywood board with neoprene rubber facing were used as the objects to be imaged. The targets were placed in the main lobe of the reflector, either broadside on, corresponding to the "on-position", or edge on, corresponding to the "off-position", to parabolic dish.

Figure 3:
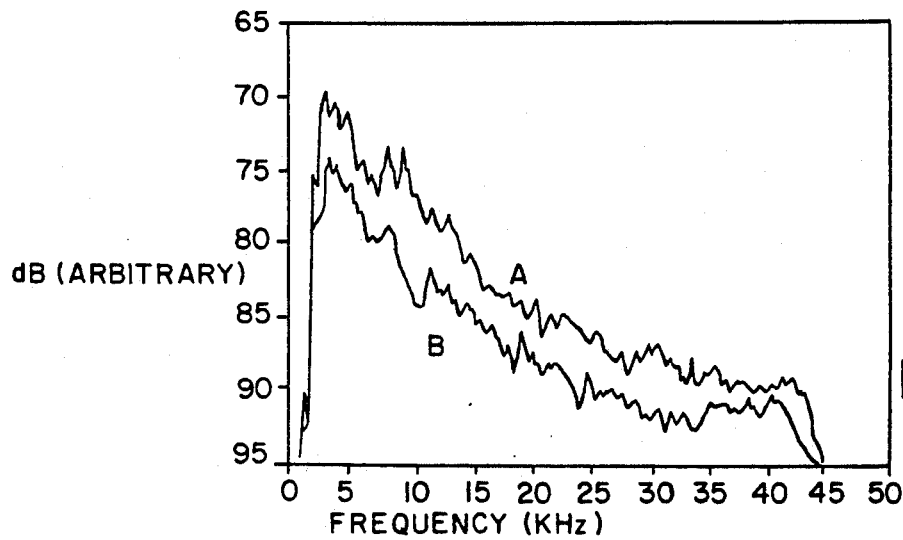
FIG. 3 is a plot of frequency versus signal amplitude showing the image noise and the background noise.
Figure 4:
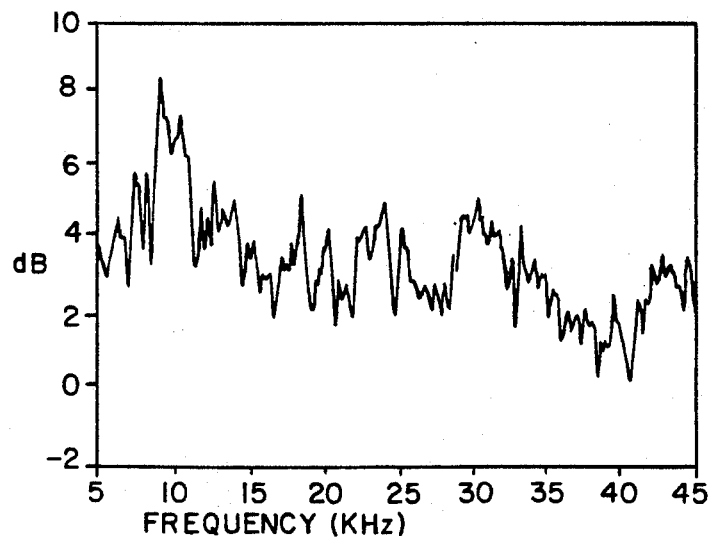
FIG. 4 is a plot of frequency versus signal amplitude showing the difference spectrum resulting from the signals of FIG. 3.

The three targets, each of which was 0.9 meter high and 0.77 meter wide were placed approximately 7 meters from the reflector. The total target width was the same as the width of the main lobe of the reflector, as measured at the $-6$ dB points, at a frequency of 9 kHz. Thus, throughout most of the 5 to 50 kHz frequency band of interest, the targets filled the beam. Noise spectra taken over the frequency range of 5 to 50 kHz are shown in FIG. 3. Both spectra are averages of several hundred spectra obtained from time series data falling within a window of two seconds duration. The spectral resolution is 100 Hz. Line A in FIG. 3 represents the noise level with the targets "on" and line B represents the targets "off". It can be seen that the noise level across the band is about 4 dB higher when the targets are "on" compared to when they are "off". Thus, the difference created by the presence of the targets can be seen. In FIG. 4 the difference spectrum is plotted.

The reflectivity of the targets, which in the experiment were perfect acoustic reflectors, influences the level of the difference signal. If the targets are absorbers of sound, a "hole" will be left in the noise field and the difference signal will be zero or negative. A negative signal can form the basis of an image, i.e., a silhouette. The important criterion is that there is acoustic contrast between the object and its background. It should be noted that variations in contrast can be introduced by local conditions. For example, if a source behind the target object is providing significantly more acoustic noise than is being generated behind the reflector, the object will be "backlit" and may appear to be only a silhouette.

In order to generate an actual image, a large number of sensors must be used. The second embodiment uses a single reflector with multiple hydrophones. In the third embodiment illustrated in FIG. 6, the acoustic sensors 20 are embedded in the hull of the remotely operated vehicle. Several thousand sensors can be utilized to produce a corresponding number of detection beams, with each beam corresponding to a pixel. The use of a multi-pixel image, besides providing a detailed image of the object, will permit detection of motion, in which the images can be updated at, for example, 10 to 30 Hz. Also, acoustic color in a image of a target object can be indicated, where frequency differences detected by the different sensors will "color" the image according to the reflection and absorption characteristics of the object.

A significant factor which affects the performance of the present invention is sound absorption in the ocean. At 20 kHz the volume attenuation is approximately 3 dB per km, suggesting that the range achievable with the inventive system is likely less than 1 km, although an improvement can be obtained by working at lower frequencies provided the reduction in angular resolution can be tolerated. In the present invention, a reasonable operating frequency range is taken to be 5 kHz to 50 kHz. While these limits may be varied, the lower limit will be determined by angular resolution considerations and the upper limit is determined by the onset of thermal noise, which is indicated in FIG. 1. Since thermal noise is molecular in origin, it contains no information about the object space and cannot be used for imaging.

Figure 8:
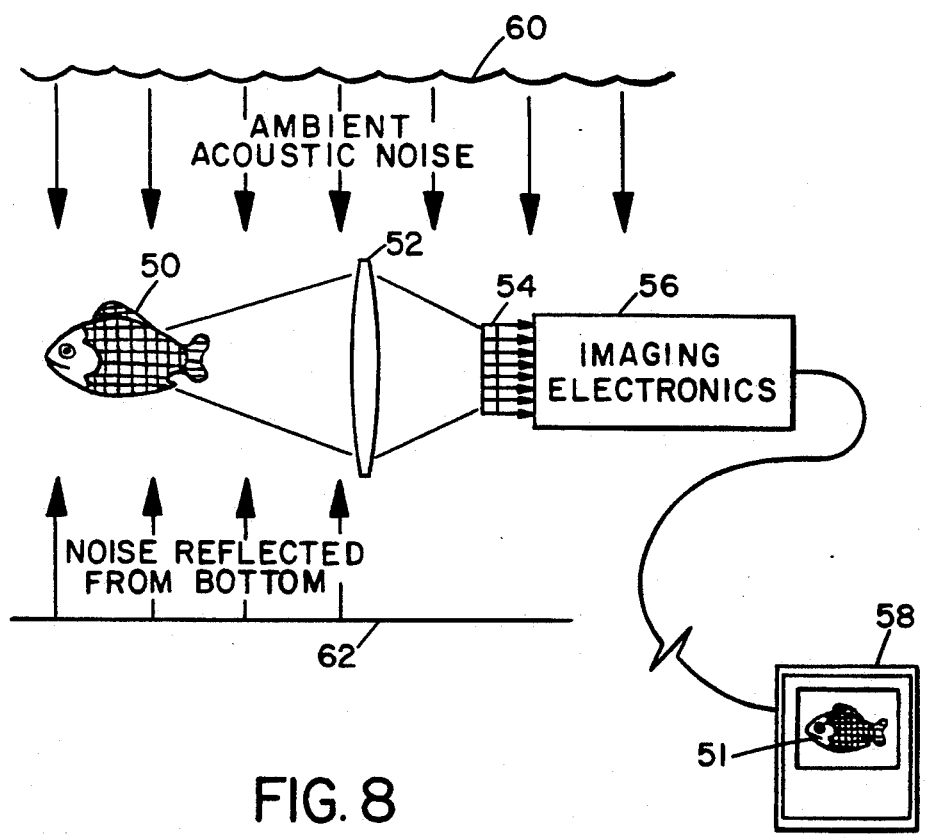
FIG. 8 is a diagram illustrating the illumination provided by ambient noise.

A summary of the invention is provided in FIG. 8. Sources of noise within the ocean water are indicated by the arrows pointing downward from the sea surface 60. This noise reflects from the ocean bottom 62 to fill the ocean with ambient acoustic noise. The ambient noise reflects off of target object 50 and is focused by acoustic lens 52, usually a reflector, onto an array of acoustic sensors 54. These sensors produce an electronic signal which is processed by imaging electronics 56 to create an image 51 of the target object on a video monitor 58. The means for collecting and converting the ambient noise, and the means for displaying the image can vary. The invention lies in the use of ambient noise in the ocean to "illuminate" a target object to create an acoustic image.

The acoustic imaging system of the present invention offers several advantages over the existing methods used to probe the ocean. Since it is does not require transmission of acoustic energy, it is covert, making it attractive for use for submarine operations. For example, mounted on the bow of a submarine, an acoustic daylight camera could act as an aid to navigation by providing forward vision to avoid hazards when navigating in mine fields or in arctic waters and to detect and classify other submarines. In either mobile or stationary configurations, acoustic daylight can be used to monitor harbor entrances, straits and fjords.

It is also useful for detection of very quiet or silent objects which are undetectable by passive systems. Other possible uses include subsurface monitoring and installation of oil drilling structures, underwater cables, pipelines and tunnels, offshore construction, dredging, monitoring marine mammal populations, monitoring fish stocks, and bottom surveying, all of which would benefit from the fact that no sound transmission is required. Further, unwanted noise sources which degrade conventional acoustic methods will actually enhance the acoustic imaging system of the present invention by providing improved "illumination".

Finally, the image produced by the acoustic daylight system would be a pictorial image on a video display unit unlike the outputs of active and passive systems which are often merely "blips" on a screen, requiring trained operators to interpret.

An additional application of the present invention is for "passive ranging". In conventional sonar ranging, a "ping" is emitted from the source and the time elapsed until the reflected signal returns is used to calculate distance to the object. The disadvantage of this technique is that the target object is alerted to the test. By using ambient noise, the distance to the target object can be determined by focusing and de-focusing the detected image, similar to using the calibrated markings on a camera lens to determine distance by focusing the lens on the object. While it may be impractical to actually move a reflector, as used in the first and second embodiments, it is possible to change the distance between the reflector and the hydrophone to vary the focus. By establishing a conversion scale for the object distance compared to the distance between the reflector and sensor, an accurate measurement can be made without requiring the use of an emitted measurement signal. Similarly, the focus of the phased array or a conformal array can be electronically varied by changing the phase delay of the signals which control the steering of the detection beam. A conversion scale can be generated to determine the appropriate conversion factor for measuring the distance to the target using phase delay data.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A method for generating a pixel of an acoustic image of a target object in an ocean environment, comprising:
   defining a detection beam between said target object and an acoustic detector, wherein a region of intersection of said detection beam and a surface of said target object corresponds to the pixel;
   detecting ambient noise reflected from said region of intersection and generating a first electrical signal comprising frequency and amplitude information;
   detecting ambient noise outside of said region of intersection and generating a second electrical signal comprising frequency and amplitude information;
   comparing said first electrical signal and said second electrical signal to determine a contrast therebetween of both frequency and amplitude information corresponding to acoustic albedo of said region of intersection on said target object; and
   generating the pixel corresponding to a level of the acoustic albedo.

2. A method as in claim 1 wherein the step of generating the pixel includes categorizing said frequency information within at least one division of a plurality of divisions in a total frequency band over which said frequency information is detected, said at least one division corresponding to an acoustic color whereby the pixel is assigned acoustic color.

3. A method as in claim 1 wherein the steps of detecting outside ambient noise and detecting reflected ambient noise each comprise focusing the ambient noise collected by a parabolic reflector onto a hydrophone at its focal point.

4. A method as in claim 1 wherein the steps of detecting outside ambient noise and detecting reflected ambient noise each comprise focusing the ambient noise collected by a spherical reflector onto a hydrophone in its focal plane.

5. A method as in claim 1 wherein the step of detecting reflected ambient noise comprises detecting the ambient noise within one scanned beam created by a phased array of sensors.

6. A method as in claim 5 further comprising mounting said phased array on a remotely operated vehicle.

7. A method as in claim 5 further comprising updating the acoustic image created by said phased array at a predetermined frequency to create a moving picture.

8. A method as in claim 2 wherein said total frequency band is from 5 kHz to 50 kHz.

9. A method for generating an acoustic image of a target object in an ocean environment having ambient noise comprising:
   determining an amplitude contrast and a frequency contrast between a first acoustic signal and a second acoustic signal obtained from a plurality of detection beams formed by an array of acoustic sensors, each acoustic signal having frequency and amplitude information, said first acoustic signal representing ambient noise reflected from a region of intersection of a detection beam and a surface of said target object and said second acoustic signal representing ambient noise detected outside of said region of intersection; and
   converting said amplitude contrast and said frequency contrast from each of said plurality of detection beams into a plurality of pixels of said image.

10. A method as in claim 9 wherein the step of generating an amplitude contrast and a frequency contrast includes providing a two-dimensional array of hydrophones generally at the focus of a spherical reflector as said array of acoustic sensors.

11. A method as in claim 9 further comprising providing a second array of acoustic sensors adjacent said array of acoustic sensors to provide a stereoscopic acoustic image.

12. A method as in claim 9 wherein the step of generating an amplitude contrast and a frequency contrast includes providing a phased array of sensors as said array of acoustic sensors.

13. A method as in claim 9 wherein the step of converting said amplitude contrast and said frequency contrast includes using said amplitude contrast to provide a shape of said image corresponding to a shape of said target object.

14. A method as in claim 9 wherein the step of converting said amplitude contrast and said frequency contrast includes using said frequency contrast to provide an acoustic color of said image corresponding to a frequency dependent reflectivity of said target object.

15. A method as in claim 9 further comprising updating said image at a pre-determined frequency so that a moving picture of said target object is generated.

16. A method as in claim 9 further comprising mounting said plurality of acoustic sensors on a remotely operated vehicle.

17. A method of detecting underwater objects and/or surfaces using ambient ocean noise comprising:

directing at least one detection beam toward the object or surface to be detected and detecting reflected ambient noise from a region on said object or surface covered by said detection beam;

detecting surrounding ambient noise outside of said region;

comparing said surrounding ambient noise and said reflected noise to generate a contrast signal comprising frequency and amplitude information; and generating an image from said frequency and amplitude information corresponding to a shape of said object or surface.

18. A method as in claim 17 wherein the step of generating an image includes providing at least one acoustic color of said image responsive to said frequency information.

19. A method as in claim 17 wherein the step of directing at least one detection beam comprises mounting a phased array of sensors on a remotely operated vehicle and controlling movement of said remotely operated vehicle to position said phased array of sensors at a selected location and within a selected distance of said object or surface to be imaged.

20. A method as in claim 17 wherein the step of directing at least one detection beam comprises locating a two-dimensional array of hydrophones at the focus of a spherical reflector, each hydrophone of said array corresponding to one detection beam.

21. A method as in claim 17 wherein the step of directing at least one detection beam comprises locating a hydrophone at the focus of a parabolic reflector.

22. A method of acoustic imaging and passive ranging of an underwater target in an ocean environment using ambient noise, the method which comprises:

forming a plurality of acoustic detection beams each having a means for varying its focal distance and a region of intersection on said underwater target;

directing each said acoustic detection beam toward said underwater target;

detecting ambient noise reflected from each said region of intersection and generating an electrical signal therefrom, said electrical signal containing amplitude and frequency information;

generating a multi-pixel acoustic image by combining and contrasting said electrical signal from each of a plurality of regions of intersection on and surrounding said underwater target, each pixel of said multi-pixel acoustic image corresponding to one said region of intersection; and determining an actual distance to said underwater target by varying said focal distance to obtain optimal contrast and amplitude within said multi-pixel acoustic image.

23. A method as in claim 22 wherein the step of determining an actual distance includes varying a distance between an acoustic sensor and a focusing reflector and providing a conversion means for deriving focal distance from sensor-reflector distance.

24. A method as in claim 22 wherein the step of determining an actual distance includes varying phase delays within a phased array of acoustic sensors and providing a conversion means for deriving focal distance from phase delay.

* * * * *